Oct. 4, 1966  R. S. HOLBROOK  3,277,291
DEVICE FOR CHRISTMAS TREES
Filed March 9, 1964
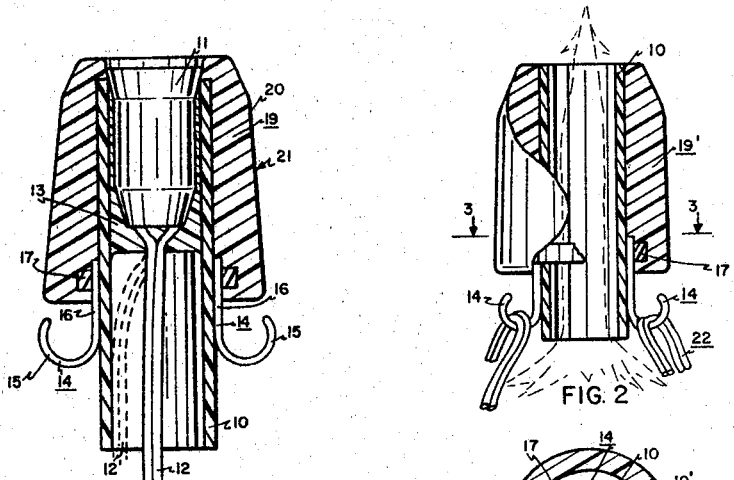
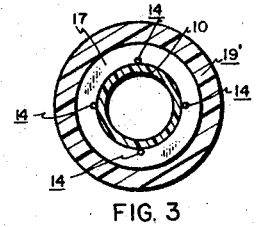
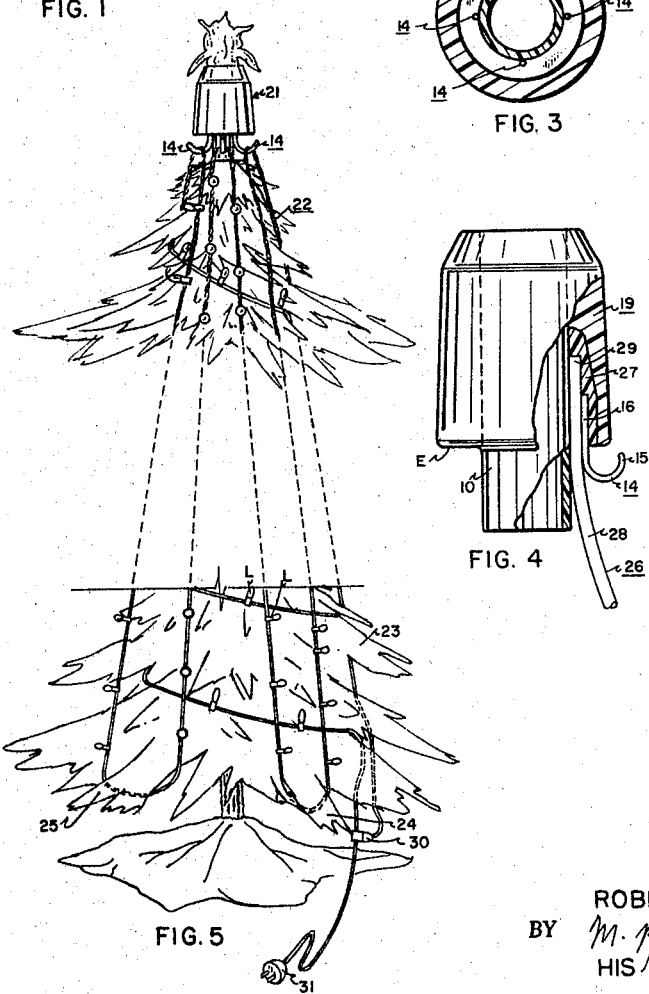
INVENTOR.
ROBERT S. HOLBROOK
BY
HIS ATTORNEY

United States Patent Office 3,277,291
Patented Oct. 4, 1966

3,277,291
DEVICE FOR CHRISTMAS TREES
Robert S. Holbrook, 239 East South Temple,
Salt Lake City, Utah
Filed Mar. 9, 1964, Ser. No. 350,211
9 Claims. (Cl. 240—10)

The present invention relates to Christmas tree devices and, more particularly, to a new and improved device for mounting to the top stem of a Christmas tree.

Accordingly, a particular object of the present invention is to provide a new and improved device for mounting over the top stem of a Christmas tree, which device is usable for serving any one of a number of purposes.

A further object of the invention is to provide a top stem Christmas tree device which is adaptable for supporting, by suitable, depending-hook means, one or more light strings which are to be draped about the tree and supported from the device.

A further object of the invention is to provide a unique tree-top ornament, including an electrical light or other means, wherein the same is configured and constructed to support one or more light strings from the top of the Christmas tree.

A further object of the invention is to provide for a device, mountable to the top stem of a Christmas tree, wherein the same may incorporate hook means and/or other means for supporting fixed or exterior lighting means therefrom.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIGURE 1 is a section view taken along a central vertical plane, illustrating the device in one form of the invention.

FIGURE 2 is a view similar to FIGURE 1 but illustrates an optional form which the invention may take.

FIGURE 3 is an enlarged, transverse, horizontal section taken along the line 3—3 in FIGURE 2.

FIGURE 4 is a cut-away vertical section similar to FIGURE 2, but illustrates yet another form of the invention.

FIGURE 5 is an elevation of a Christmas tree with the top portion enlarged and the central portion thereof not shown, for purposes of convenience of illustration, and wherein the tree incorporates the tree-top device of the present invention to support one or more light strings which are to be draped about the tree.

In FIGURE 1 mounting tube 10, preferably of cylindrical construction, is made of plastic such as rigid polyethylene. Disposed in mounting tube 10 is a tube socket 11, the same including the conventional electric conductor pair or wire leads 12; the socket 11 is secured in place by a thermosetting plastic material 13 which, during fabrication of the device, is simply poured in a molten state within mounting tube 10, when the same is inverted, to harden and thereby secure the socket 11 in place.

At least one but preferably plural support hooks 14 are provided, each including respective hook portions 15 and shanks 16. These shanks are mutually spaced transversely about the periphery of mounting tube 10 and are secured in place by a support hook retainer 17 which preferably is annular in form. This retainer may simply comprise a "ring" of plastic glue for securing the support hooks 14 in place. Support hooks 14 are preferably made from a plastic or other electrically non-conductive material.

Once securement of the support hooks to mounting tube 10 is achieved then, in the fabrication process of the device, the same (i.e. mounting tube 10) is simply inverted and inserted into a mold of convenient form and suitable, pre-liquefied, thermosetting plastic is poured exterior of mounting tube 10 so as to form the molded body 19. It will be noted that the molded body supplies the outer contour 20 of the device and indeed, in the molding process, becomes affixed to the mounting tube 10 and shanks 16 of support hooks 14, encompassing retainer 17 with the shanks of the support hooks.

As will be noted in FIGURE 1, the plastic support hooks 14 are radially outwardly directed with respect to mounting tube 10 and are mutually spaced. The support hooks are for the purpose of supporting one or more light strings in a manner as will be seen in connection with FIGURE 5. Thus, the overall device 21 is mounted to the top stem of a Christmas tree. By being so mounted it will accommodate not only a top light such as a "star" but also will support a long string of lights (22), which light string 22 will be looped over the respective support hooks 14 and around the bottom branches of the tree 23 as at 24 and 25. Thus, it will be seen that the support hooks 14 may accommodate doubled-back, vertical runs of the light string 22 completely around the tree. Of course, when the socket 11 is employed as in FIGURE 1, then the electrical leads 12 accommodating the same will assume a dotted line configuration 12' as indicated in FIGURE 1 to make room for the top stem of the tree.

In FIGURE 2 the structure is identical to that shown in FIGURE 1, including the same or a similar mounting tube 10, support hook retainer 17, and support hooks 14 for releasably retaining the light string 22 in supported vertical position. Similarly, a body 19' is provided which is substantially identical to body 19 in FIGURE 1. However, the socket 11 is deleted. This may indeed be so and, when such is not included in the design, then a mounting tube 10 will accommodate the positioning of the top stem of the Christmas tree clear through the same as indicated in dotted lines in FIGURE 2.

FIGURE 3, in being a transverse section of the structure shown in FIGURE 2, for example, illustrates the mutual spacing of support hook 14 transversely about the outer periphery of mounting tube 10. Again, the ring-like retainer 17, while conceivably of other material such as tape or a rubber band or other item, is preferably plastic glue of a nature so as to secure the support hooks in mutually spaced relationship preparatory to the molding of the composite device.

In FIGURE 4 is likewise provided a mounting tube 10 and a molded body 19. Also included is a support hook 14 much similar to that illustrated in FIGURES 1–3. Now FIGURE 4 illustrates that a conductive or electrical lead pair 28 of light string 26 may be included in the design to provide for electrical light sockets electrically connected in parallel, with the upper extremity 29 of the light string 26 being preliminarily secured in place by means 27, such as plastic glue, which secures the same to the outer periphery of mounting tube 10. Correspondingly, with the same securement by the plastic glue or other means 27, the support hook might also receive initial implacement as shown.

Upon such implacement the device is inserted into a mold and the molded body 19 provided, with the molded body encompassing the mounting tube 10, the shank 16 of support hook 14, and the upper extremity 29 of the light string 26. It will be noted that the support hook 14 is so positioned that, in all embodiments the bottom edge E of the molded body will be sufficiently relieved from the hook portion 15 of support hook 14, and as will be the case for the other embodiments so as to permit the hook portion 15 to receive an electrical light string for support thereof.

FIGURE 5, in review clearly indicates the light string 22 as being provided with a conventional branch socket 30 and electrical plug 31 in a conventional manner. All of the lights L in FIGURE 5 will be connected in parallel.

Thus, it will be seen that in all the embodiments present in the invention a novel, decorative device for the top stem of a Christmas tree may be designed so as to incorporate accessible and usable support hooks 15 for supporting a long run of a double-back light string, much similar to that illustrated in FIGURE 5 at 22. The support hook design may be incorporated in the device whether the device is or is not provided with a conventional light socket 11. Furthermore, the device itself may additionally support a vertical light string, merely by way of example, as seen at 26 in FIGURE 4.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A device mountable to and around the top stem of a Christmas tree and including, in combination, a mounting tube for disposition over said top stem, support hook means including shank means secured to said mounting tube and hook portion means integral with and depending from said shank means, and a molded body affixed to and encompassing said mounting tube and said shank means, said hook portion means being accessably and operatively disposed outside of said molded body and being adapted to receive and support light string means.

2. A device mountable to and around the top stem of a Christmas tree and including, in combination, a mounting tube for disposition over said top stem, support hook means including shank means secured to said mounting tube and hook portion means integral with and depending from said shank means, and a molded body affixed to and encompassing said mounting tube, said hook portion means being accessably and operatively disposed outside of and underneath said molded body and being adapted to receive and support light string means.

3. A device mountable to and around the top stem of a Christmas tree and including, in combination, a mounting tube for disposition over said top stem, plural support hooks each including a respective shank secured to said mounting tube and a respective hook portion integral with and depending from said shank, said shanks of said plural support hooks being mutually peripherally spaced about said mounting tube, and a molded body affixed to and encompassing said mounting tube and said shank means, said hook portions being accessably and operatively disposed outside of said molded body and adapted to receive and support light string means.

4. Structure according to claim 3 wherein said hook portions are outwardly, radially directed with respect to said mounting tube.

5. A device mountable to and around the top stem of a Christmas tree and including, in combination, a mounting tube for disposition over said top stem, plural support hooks each including a respective shank secured to said mounting tube and a respective hook portion integral with and depending from said shank, retainer means so securing said support shanks to said mounting tube, said shanks of said plural support hooks being mutually peripherally spaced about said mounting tube, and a molded body affixed to and encompassing said mounting tube and said shank means, said hook portions being accessably and operatively disposed outside of said molded body and adapted to receive and support light string means.

6. A device mountable to and around the top stem of a Christmas tree and including, in combination, a mounting tube for disposition over said top stem, support hook means including shank means secured to said mounting tube and hook portion means integral with and depending from said shank means, and a molded body affixed to and encompassing said mounting tube, said hook portion means being accessably and operatively disposed outside of said molded body and being adapted to receive and support light string means.

7. A device mountable to and around the top stem of a Christmas tree and including, in combination, a mounting tube for disposition over said top stem, a light socket coaxial with and secured to said mounting tube at one extremity thereof and having accessable electrical leads, support hook means including shank means secured to said mounting tube and hook portion means integral with and depending from said shank means, and a molded body affixed to and encompassing said mounting tube, said light socket, and said shank means, said hook portion means being accessably and operatively disposed outside of said molded body and being adapted to receive and support light string means.

8. A device mountable to and around the top stem of a Christmas tree and including, in combination, a mounting tube for disposition over said top stem, elongate electrical lighting means having an upper extremity secured to said mounting tube, support hook means including shank means secured to said mounting tube and a hook portion means, and a molded plastic body disposed about, encompassing, and affixed to the outer periphery of said mounting tube, said upper extremity of said electrical lighting means and said shank portion of said support hook means, leaving said hook portion means accessable for supporting an external light string.

9. Structure according to claim 8 wherein said support hook means is secured to said mounting tube over said upper extremity of said elongate electrical lighting means.

References Cited by the Examiner

UNITED STATES PATENTS

| 1,613,386 | 1/1927 | Ekdahl | 161—23 X |
| 1,980,948 | 11/1934 | Abramson | 240—10 |
| 2,683,210 | 7/1954 | Baenziger | 240—10 |
| 3,009,052 | 11/1961 | Holbrook | 240—10 |
| 3,118,618 | 1/1964 | Holbrook | 240—10 |
| 3,123,514 | 3/1964 | Molinaro | 161—23 X |

FOREIGN PATENTS 15,453   1898   Great Britain.

NORTON ANSHER, *Primary Examiner.*